United States Patent
Yumoto et al.

(10) Patent No.: US 6,526,500 B1
(45) Date of Patent: Feb. 25, 2003

(54) DATA DRIVEN TYPE INFORMATION PROCESSING SYSTEM CONSISTING OF INTERCONNECTED DATA DRIVEN TYPE INFORMATION PROCESSING DEVICES

(75) Inventors: Manabu Yumoto, Nara (JP); Manabu Onozaki, Nara (JP); Tsuyoshi Muramatsu, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/482,881

(22) Filed: Jan. 14, 2000

(30) Foreign Application Priority Data

Jan. 18, 1999 (JP) ............................. 11-009449

(51) Int. Cl.$^7$ .................. G06F 15/82; G06F 15/17; G06F 13/20
(52) U.S. Cl. .................. 712/25; 712/26; 712/27; 712/201; 709/239
(58) Field of Search ..................... 712/26, 25, 27, 712/29, 201; 709/239, 238

(56) References Cited

U.S. PATENT DOCUMENTS

| | | | |
|---|---|---|---|
| 5,404,539 A | 4/1995 | Onozaki | 710/240 |
| 5,452,464 A | 9/1995 | Nomura et al. | 712/201 |
| 5,483,661 A | 1/1996 | Yoshida et al. | 712/26 |
| 5,577,256 A | 11/1996 | Muramatsu et al. | 712/214 |
| 5,586,281 A | 12/1996 | Miyama et al. | 711/220 |
| 5,590,355 A | 12/1996 | Shichiku et al. | 712/26 |
| 5,630,151 A | 5/1997 | Muramatsu et al. | 712/201 |
| 5,640,525 A | 6/1997 | Yumoto et al. | 712/201 |
| 5,652,906 A | 7/1997 | Kadosumi et al. | 712/201 |
| 5,748,933 A | 5/1998 | Amagai et al. | 712/201 |
| 5,761,737 A | 6/1998 | Kadosumi et al. | 711/169 |
| 5,794,064 A | 8/1998 | Yoshida et al. | 712/25 |
| 5,794,065 A | 8/1998 | Hatakeyama et al. | 709/247 |
| 5,812,806 A | 9/1998 | Muramatsu et al. | 712/201 |
| 5,848,290 A | 12/1998 | Yoshida et al. | 712/26 |
| 5,860,019 A | 1/1999 | Yumoto | 712/201 |
| 5,870,620 A | 2/1999 | Kadosumi et al. | 712/26 |
| 5,872,991 A | 2/1999 | Okamata et al. | 712/26 |
| 5,918,063 A | 6/1999 | Miyama et al. | 712/25 |
| 5,956,517 A | 9/1999 | Okamoto et al. | 712/18 |
| 6,275,928 B1 * | 8/2001 | Kado | 712/25 |

FOREIGN PATENT DOCUMENTS

JP    A 6259583    9/1994

* cited by examiner

*Primary Examiner*—Daniel H. Pan
(74) *Attorney, Agent, or Firm*—Birch, Stewart, Kolasch & Birch, LLP

(57) ABSTRACT

The data driven type information processing system has a branch unit and a junction unit in the input and output stages thereof, and includes a plurality of data driven type processors between the branch unit and the junction unit. The branch unit, the junction unit and the plurality of data driven type processors are coupled to one another via transmission paths. Each of the data driven type processors can process a unique instruction system. The junction unit collects data packets provided via the transmission paths and outputs the collected data packets to the outside of the system. In operation, when a data packet is provided to the system, the branch unit receives the data packet provided thereto and, according to an instruction code within the received data packet, selects a transmission path connected to a data driven type processor that can process an instruction system corresponding to the instruction code, and sends out the received data packet to the selected transmission path. Upon reception of the data packet via the transmission path, each of the data driven type processors processes the received data packet in a prescribed manner, and, according to the result of the processing and based on the instruction code within the obtained data packet, selects a transmission path connected to a data driven type processor that can process the instruction system corresponding to the instruction code, and sends out the data packet to the selected transmission path.

7 Claims, 15 Drawing Sheets

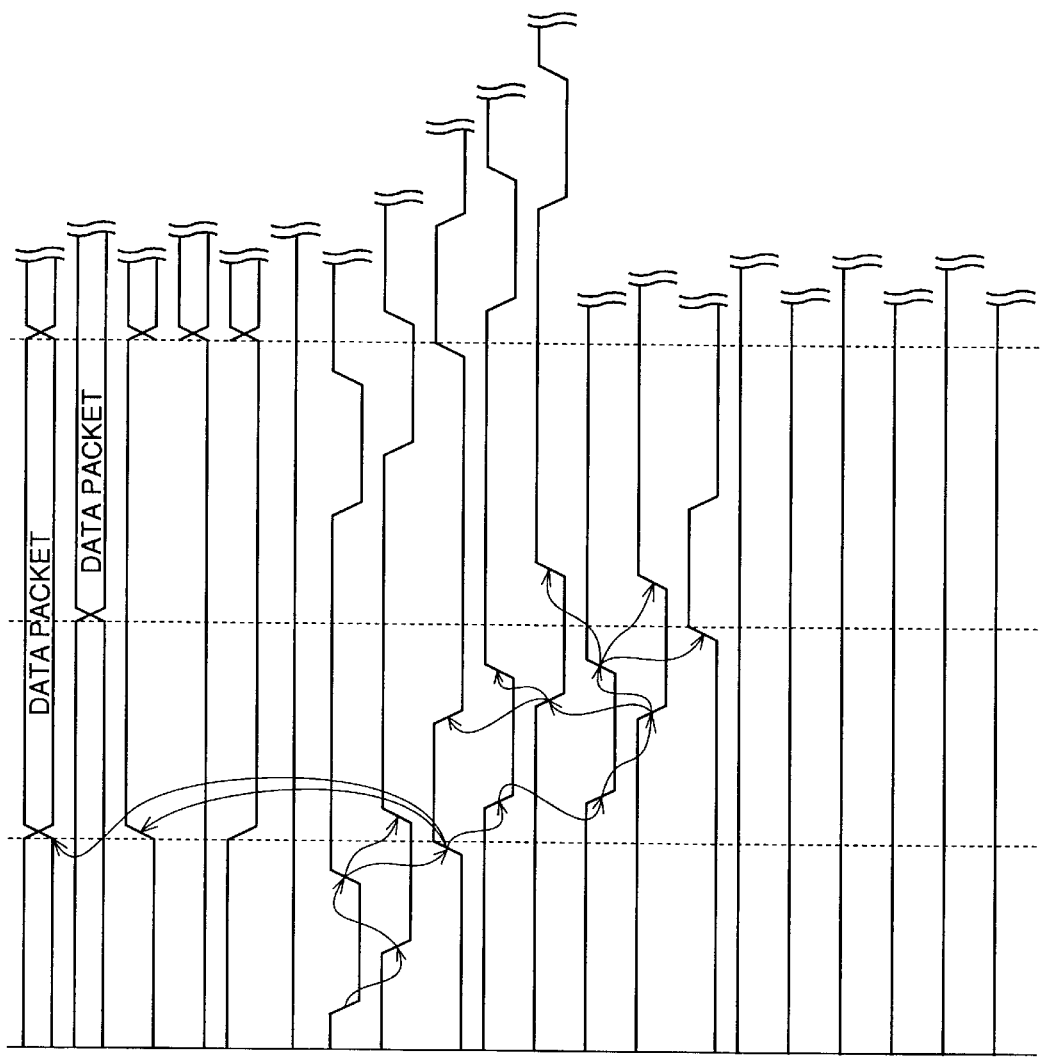

FIG. 7A DATA LATCH CIRCUIT 1004 (OUTPUT)
FIG. 7B DATA LATCH CIRCUIT 100A2 (OUTPUT)
FIG. 7C BA1
FIG. 7D BB1
FIG. 7E BC1
FIG. 7F BO1
FIG. 7G "CI" OF TRANSFER CONTROL ELEMENT 1002
FIG. 7H "RO" OF TRANSFER CONTROL ELEMENT 1002
FIG. 7I "CP" OF TRANSFER CONTROL ELEMENT 1002
FIG. 7J "CO" OF TRANSFER CONTROL ELEMENT 1002
FIG. 7K "RI" OF TRANSFER CONTROL ELEMENT 1002
FIG. 7L "CI" OF TRANSFER CONTROL ELEMENT 100A1
FIG. 7M "RO" OF TRANSFER CONTROL ELEMENT 100A1
FIG. 7N "CP" OF TRANSFER CONTROL ELEMENT 100A1
FIG. 7O "CI" OF TRANSFER CONTROL ELEMENT 100B1
FIG. 7P "RO" OF TRANSFER CONTROL ELEMENT 100B1
FIG. 7Q "CI" OF TRANSFER CONTROL ELEMENT 100C1
FIG. 7R "RO" OF TRANSFER CONTROL ELEMENT 100C1
FIG. 7S "CI" OF TRANSFER CONTROL ELEMENT 1021
FIG. 7T "RO" OF TRANSFER CONTROL ELEMENT 1021

FIG. 14A PRIOR ART

| PE NUMBER | NODE NUMBER | GENERATION NUMBER | INSTRUCTION CODE | LEFT/RIGHT DATA FLAG | FIRST OPERAND |
|---|---|---|---|---|---|
| 50 | 51 | 54 | 53 | 52 | 55 |

| PE NUMBER | NODE NUMBER | GENERATION NUMBER | INSTRUCTION CODE | LEFT/RIGHT DATA FLAG | FIRST OPERAND | SECOND OPERAND |
|---|---|---|---|---|---|---|
| 50 | 51 | 54 | 53 | 52 | 55 | 56 |

| PE NUMBER | NODE NUMBER | GENERATION NUMBER | FIRST OPERAND |
|---|---|---|---|
| 50 | 51 | 54 | 55 |

PC1

ADDRESSING BASED ON
NODE NUMBER

DATA DRIVEN TYPE INFORMATION PROCESSING SYSTEM CONSISTING OF INTERCONNECTED DATA DRIVEN TYPE INFORMATION PROCESSING DEVICES

BACKGROUND OF THE INVENTION

1. Field of the Invention

The present invention relates to data driven type information processing systems, and more particularly, to a data driven type information processing system suitable for interconnecting a plurality of data driven type information processing devices into a multi-network form.

2. Description of the Background Art

In a von-Neumann type computer, various instructions are prestored as a program in a program storage unit. These instructions are read out for execution by a program counter, which sequentially designates addresses in the program storage unit.

In contrast, the data driven type information processing device is a kind of non-von-Neumann computer, which is free from the concept of such sequential execution of instructions by the program counter. In the data driven type information processing device, instructions become ready for execution once data to be operated are collected, and a plurality of instructions are executed in parallel. The device is advantageous in that time required for operation can be significantly reduced.

FIG. 13 is a block configuration diagram of a conventional data driven type processor. FIGS. 14A to 14C illustrate field configurations of data packets to be processed in the data driven type processor shown in FIG. 13. FIG. 15 is a diagram showing an example of the contents stored in the program storage unit of FIG. 13. FIG. 16 shows a configuration of a system including a plurality of data driven type processors each as shown in FIG. 13.

The data packet PA1 shown in FIG. 14A includes a processor (PE) number 50, a node number 51, a left/right data flag 52, an instruction code 53, a generation number 54, and a first operand 55. The data packet PB1 in FIG. 14B includes a second operand 56 in addition to the contents of data packet PA. The data packet PC1 in FIG. 14C includes PE number 50, node number 51, generation number 54, and first operand 55.

Data driven type processor PE1 in FIG. 13 includes: branch units 20 and 25 that each input an applied data packet, compare contents of the input data packet with contents preset in an internal memory, and output the input data packet to an output destination that is selected in accordance with the result of comparison; junction units 21 and 27 that each input the data packets applied thereto and sequentially output the same; a firing control unit 22; an operation processing unit 23; a program storage unit 24 that prestores a data flow program as shown in FIG. 15; and an internal data buffering unit 26.

Branch units 20 and 25 have internal memories 201 and 251, respectively. Memories 201 and 251 each have a PE number that uniquely identifies the relevant data driven type processor PE1. This PE number is prestored by software or preset by an external terminal (not shown).

In operation, branch unit 20 determines whether PE number 50 of data packet PA1 input from an input port IN and the PE number preset in memory 201 match with each other. If they match, branch unit 20 outputs input data packet PA1 to junction unit 21; if not, input data packet PA1 goes to junction unit 27. Junction unit 21 inputs both the data packet PA1 output from branch unit 20 and the data packet PA1 output from internal data buffer 26, and sequentially outputs the input data packets PA1 to firing control unit 22, while controlling the stream of the data packets.

Firing control unit 22 detects two data packets, which are to constitute a pair for a binary operation instruction. In other words, two data packets PA having the same node numbers 51 and generation numbers 54 are waited for and, when the matching is complete (i.e., when the paired data are detected), the two data packets PA1 are combined and output as a single data packet PB1 to operation processing unit 23. At this time, respective one of the first operands 55 of the two data packets PA1 detected as the paired data is set to either one of the first and second operands 55 and 56 of data packet PB1, depending on the left/right data flags 52 of the respective data packets PA1 detected as the paired data.

Operation processing unit 23 performs, according to instruction code 53 of input data packet PB1, operation for corresponding first or second operand 55 or 56, and outputs data packet PC1, having a result of the operation stored therein as first operand 55, to program storage unit 24.

Program storage unit 24 prestores a data flow program consisting of a plurality of processor numbers PE, a plurality of node numbers ND, a plurality of instruction codes OP and a plurality of left/right data flags DF, as shown in FIG. 15. Program storage unit 24 inputs data packet PC applied thereto, and reads out, by addressing based on the node number 51 of the input packet PC1, a subsequent processor number PE, a subsequent node number ND, a subsequent instruction code OP and a subsequent left/iight data flag DF from the data flow program. The read out processor number PE and node number ND are set as PE number 50 and node number 51 of the input data packet PC1, and the read out instruction code OP and left/right data flag DF are added to the input data packet PC1 as instruction code 53 and left/right data flag 52, respectively (generation number 54 remains unchanged). Data packet PA1 is thus obtained, which is then output to branch unit 25. This is called "instruction fetch."

Branch unit 25 inputs data packet PA1 output from program storage unit 24, and determines whether PE number 50 of the input data packet PA1 and the PE number within the memory 251 match with each other. If they match, branch unit 25 outputs input data packet PA1 to internal data buffering unit 26. If they do not mach, data packet PA1 is output to junction unit 27.

Internal data buffering unit 26 inputs data packets PA1 applied thereto, and sequentially outputs them to junction unit 21.

Thus, the data packets are transmitted along junction unit 21→ firing control unit 22→ operation processing unit 23→ program storage unit 24→ branch unit 25, and processing for one node in a data flow graph, which is expressed by the data flow program prestored in program storage unit 24, is completed.

The data flow graph (or, the data flow program) is carried out by repeating the paired data detection, the operation processing and the instruction fetch for the data packets, as explained above.

One way to improve processing performance of the above-described data driven type information processor is to incorporate a plurality of data driven type processors PE within a single system.

The Japanese Patent Laying-Open No. 6-259583 discloses a system consisting of a plurality of data driven type processors 1 to 4, as shown in FIG. 16, wherein a method of interconnecting the processors is disclosed. In this reference, the processors are connected with one another via processor-to-processor transmission paths. In operation, a data packet is transmitted through the transmission paths to a processor by which the data packet itself is to be processed. Here, an appropriate, short route is chosen therebetween, according to processor designating information (i.e., the PE number) within the data packet that designates its relevant processor, and a prescribed condition. That is, each processor within the system includes memories 201 and 251, as shown in FIG. 13, which store information for uniquely identifying the processor itself (i.e., the PE number). Thus, the data packets are processed in respective processors, while the processor designating information (the PE number) within each data packet and the PE number set in each processor are compared with each other.

In an effort to realize an integrated circuit of data driven type processors, the operation processing capability has been steadily improved, and the number of processors forming one system has been increased. Accordingly, the scale of circuits has been also increased, which results in increases in cost, in power consumption and in the number of terminals. Further, cost increases for countermeasures against radiation within a package due to the increase in the power consumption, as well as cost increases for countermeasures against unnecessary emission due to the increased number of terminals are tremendous.

SUMMARY OF THE INVENTION

An object of the present invention is to provide an economical data driven type information processing system.

The data driven type information processing system according to an aspect of the present invention is a system in which a plurality of data driven type processors (hereinafter, simply referred to as "processors") for processing data packets storing at least instruction information are interconnected via a plurality of data transmission paths for transmitting the data packets. The system has the following features.

Each of the plurality of processors in the system is capable of processing a different instruction system consisting of at least one type of instruction information. Further, the plurality of data transmission paths include processor transmission paths for transmitting data packets to the plurality of processors, respectively.

The data driven type information processing system has a first path select unit to which the plurality of data transmission paths including the processor transmission paths corresponding to the plurality of processors are connected. The first path select unit refers to instruction information within a received data packet, and selects, from the plurality of data transmission paths connected thereto, a processor transmission path connected to a processor that can process an instruction system corresponding to the type of the instruction information. It then outputs the received data packet to the selected processor transmission path.

Each of the plurality of processors includes: a second path select unit to which a plurality of data transmission paths including processor transmission paths respectively corresponding to the other processors are connected; and a processing unit. The processing unit receives a data packet, performs, using the received data packet, information processing including an operation based on the instruction information, and outputs the data packet obtained by the information processing to the second path select unit.

The second path select unit refers to the instruction information within the data packet received from the processing unit, and selects, from the plurality of data transmission paths connected thereto, a processor transmission path connected to a processor that can process the instruction system corresponding to the type of the instruction information. It then outputs the received data packet to the selected processor transmission path.

According to an aspect of the present invention, the first and the second path select units each select, based on instruction information within a data packet, a processor transmission path connected to a processor that can process the data packet, and transmit the data packet via the processor transmission path. In other words, in the system, and in each of the processors, each data packet is output based on the instruction information within the data packet such that it is allocated to a processor that can process the instruction information.

Accordingly, it is unnecessary to add processor numbers to respective processors as in the conventional manner, and hence, it is unnecessary to provide PE number storing regions within the data packets. It is thus possible to reduce the circuit scale for the system, and correspondingly, to reduce the cost and power consumption.

The reduction in the power consumption leads to reduction in the cost for countermeasures against radiation within the package incorporating the system. In addition, with no need of the PE number storing region within the data packet, the data width in a data packet can be decreased. The number of terminals for the data packets in the system is also decreased, so that unnecessary emission is reduced.

Further, the first path select unit is disposed outside the plurality of processors (at an input stage of the system). Therefore, at the time of system configuration, the processors can be disposed in an orderly fashion, regardless of differences in the operation processing units of the processors. Accordingly, the system is advantageously applied to the case where orderly layout of processors is required.

The above-described data driven type information processing system may further include the following features.

The first path select unit further includes an external transmission path connected with the outside of the system. It selects, based on the instruction information within the received data packet, either the external transmission path or a processor transmission path connected to a processor that can process an instruction system corresponding to the type of the instruction information. It then outputs the received data packet to the selected transmission path.

The second path select unit further includes an external transmission path connected with the outside of the system. It selects, based on the instruction information within the data packet received from the processing unit, either the external transmission path or a processor transmission path connected to a processor that is able to process an instruction system corresponding to the type of the instruction information, and outputs the received data packet to the selected transmission path.

According to the data driven type information processing system as described above, the first and the second path select units can selectively provide each data packet input, either to any of the internal processors within the system that can process the relevant data packet or to a processor outside the system, based on the instruction information.

The above-described data driven type information processing system may further include the following features.

The second path select unit further includes a processing unit transmission path connected with the processing unit.

Upon reception of a data packet from the processing unit, the second path select unit selects, based on the instruction information within the received data packet, any path among: 1) a processor transmission path connected to a processor that can process an instruction system corresponding to the type of the instruction information; 2) the external transmission path; or 3) the processing unit transmission path. It then outputs the received data packet to the selected transmission path.

According to the data driven type information processing system as described above, the second path select unit can selectively provide the received data packet to any of 1) a processor inside the system that can process the relevant data packet, 2) the processing unit, or 3) a processor outside the system, based on the instruction information within the received data packet.

In the data driven type information processing system according to another aspect of the present invention, a plurality of data driven type processors (hereinafter, referred to as "processors") are communicated with one another via transmission paths, through which data packets storing at least instruction information are transmitted. The data driven type information processing system further includes the following features.

Each of the plurality of processors is able to operate a different instruction system consisting of at least one type of instruction information. Herein, each processor includes a path select unit to which data packets are externally provided, and a processing unit connecting transmission paths. The processing unit performs, upon reception of a data packet from the transmission path, information processing including an operation based on the received instruction information within the received data packet, and outputs the received data packet obtained by the information processing to the path select unit.

The path select unit selects, upon reception of the data packet, a transmission path connected either to another processor or to the processing unit that can operate the instruction system corresponding to the type of the instruction information, based on the instruction information within the received data packet. It then outputs the received data packet to the selected transmission path.

According to the data driven type information processing system as described above, the path select unit of each processor selects a transmission path connected to either the processor itself (the processing unit) or another processor that can process an instruction system corresponding to the type of the instruction information, based on the instruction information in the received data packet, and outputs the received data packet to the selected transmission path. In other words, each processor of the system outputs the received data packet to either the processor itself or another processor based on the instruction information within the received data packet, so that the received data packet can be allocated to a processor capable of processing the instruction information.

Accordingly, it is unnecessary to add a processor number to each processor as in the conventional manner, and hence, a PE number storing region is unnecessary within the data packet. Therefore, it is possible to reduce the circuit scale, and thus, to reduce the cost and the power consumption of the system.

As the power consumption is decreased, the cost for countermeasures against radiation within the package incorporating the system is also reduced. Further, as the PE number storing region is unnecessary within the data packet, the data width of the data packet is also reduced. Therefore, the number of terminals for the data packets in the system is decreased, and hence, unnecessary emission can be reduced.

In addition, in the data driven type information processing system as described above, each processor independently determines whether it can process a data packet or not. Accordingly, it is possible to alter the layout of the processors according to the differences of the processing units (the instruction systems that can be processed) in the processors. Therefore, the system is advantageously applied to the case where it is difficult to achieve orderly disposition of the processors.

The above-described data driven type information processing system may further include the following features.

The path select unit includes a transmission path that is connected with the outside of the system at its output stage. The path select unit selects, based on the instruction information within the received data packet, a transmission path connected to any of 1) another processor, 2) the processing unit, or 3) the outside of the system that can operate an instruction system corresponding to the type of the instruction information. It then outputs the received data packet to the selected transmission path.

According to the data driven type information processing system as described above, the path select unit can selectively provide the received data packets either to any of the processors within the system including the processor itself (the processing unit) or to a processor outside the system, based on the instruction information within the received data packet.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A to 7T are timing charts illustrating the operation of the branch unit shown in FIG. 3.

FIGS. 14A to 14C are diagrams illustrating field configurations of data packets processed in the processor shown in FIG. 13.

DESCRIPTION OF THE PREFERRED EMBODIMENTS

Hereinafter, first and second embodiments of the present invention will be described with reference to the drawings.

First Embodiment

Figure 1:
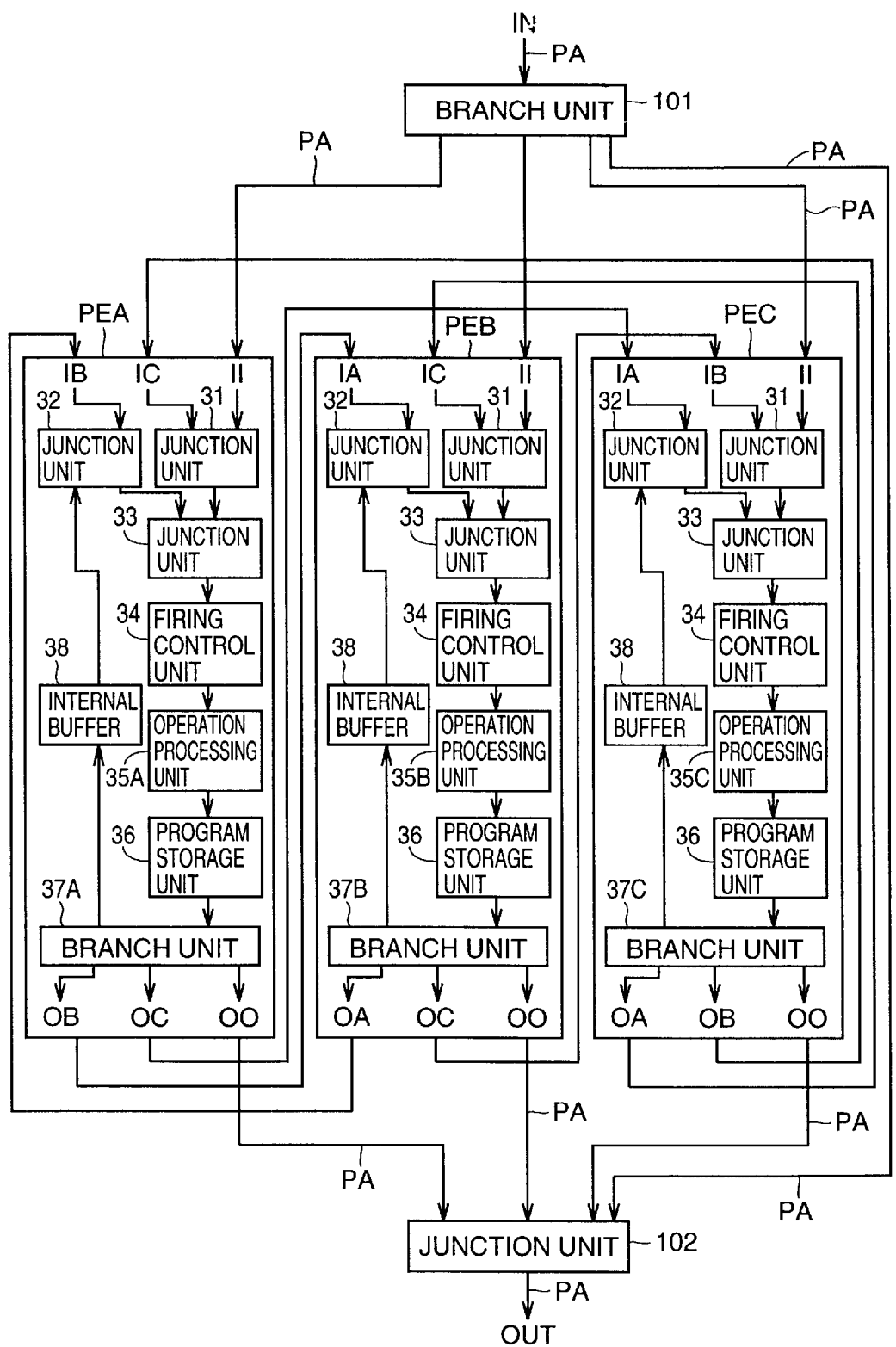
FIG. 1 is a diagram showing a configuration of a system including a plurality of data driven type information processing devices according to a first embodiment of the present invention.
Figure 2:
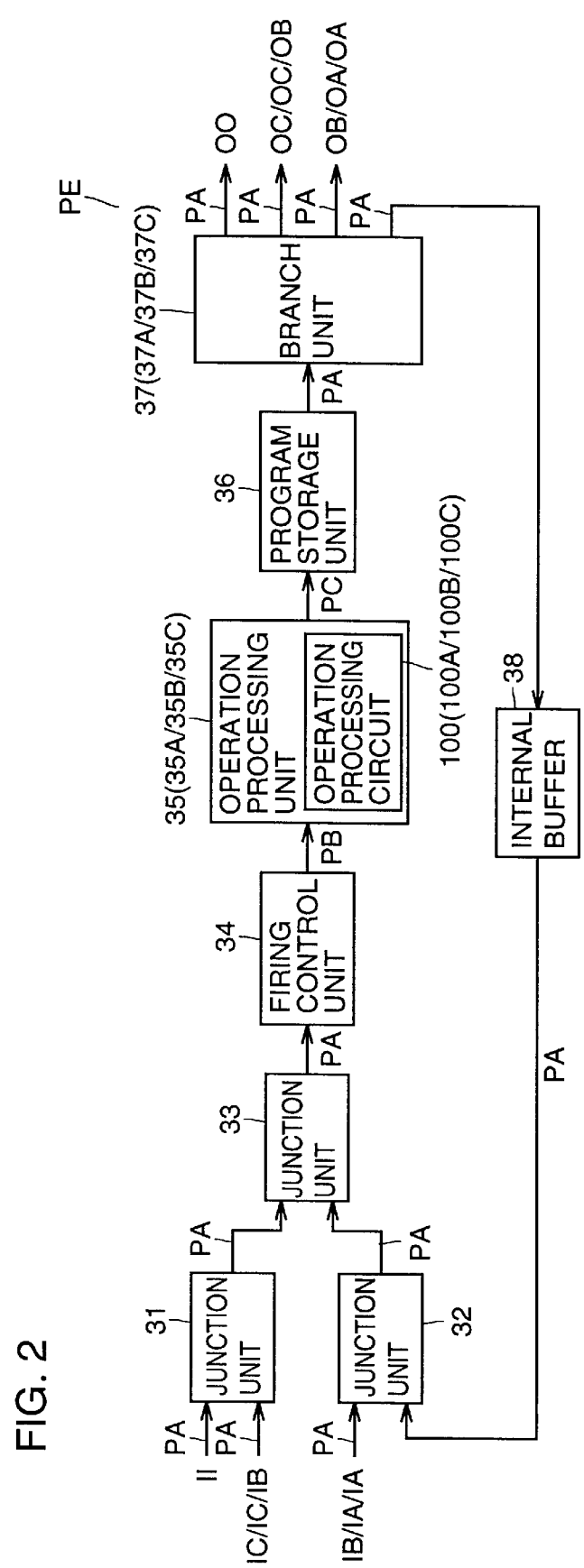
FIG. 2 is a block configuration diagram of the data driven type information processing device according to the first embodiment of the present invention.

FIG. 1 is a diagram showing a configuration of a system including a plurality of data driven type information processing devices according to the first embodiment of the present invention. FIG. 2 is a block diagram of the data driven type information processing device according to the first embodiment.

Figure 3:
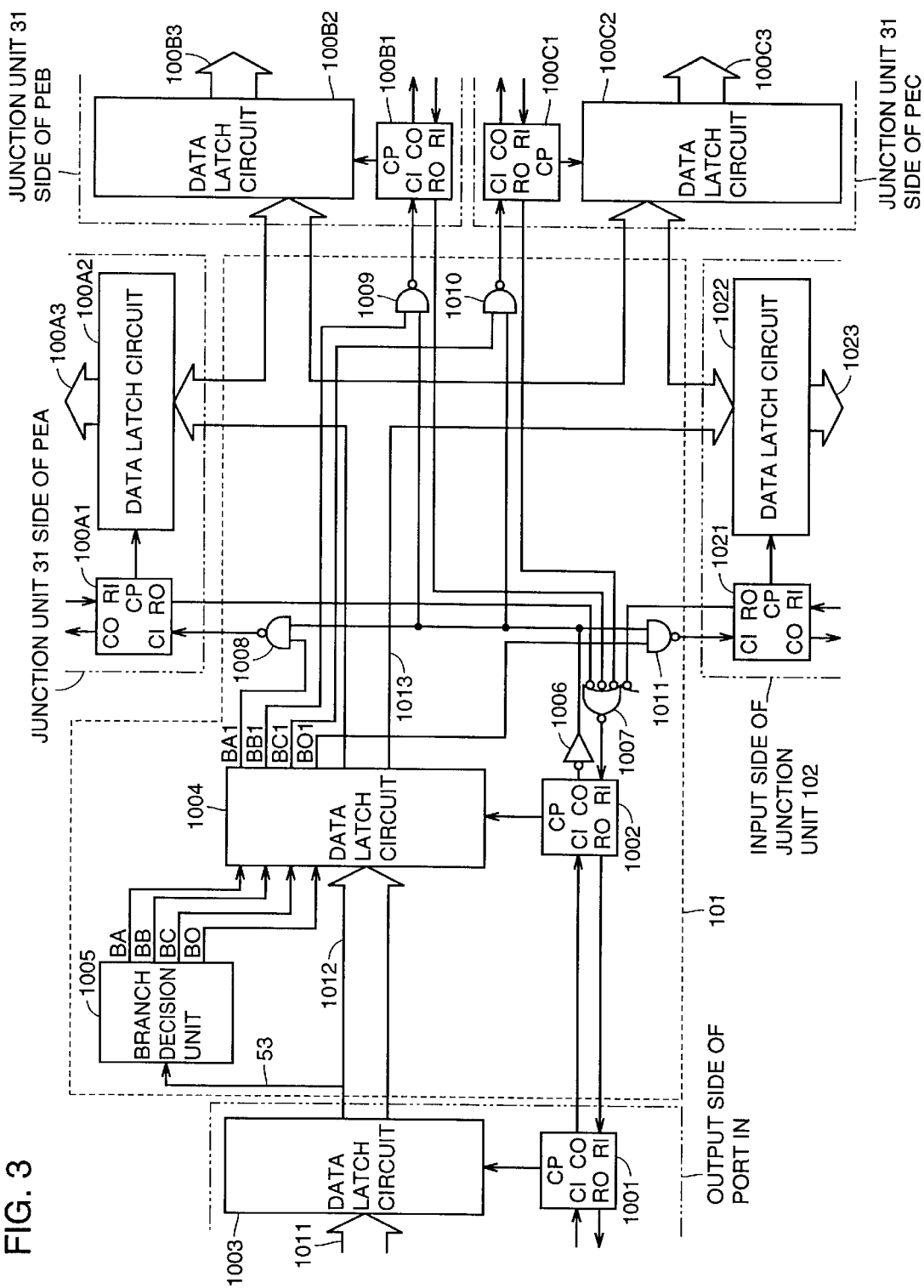
FIG. 3 is a diagram showing a detailed configuration of the branch unit shown in FIG. 1.
Figure 4:
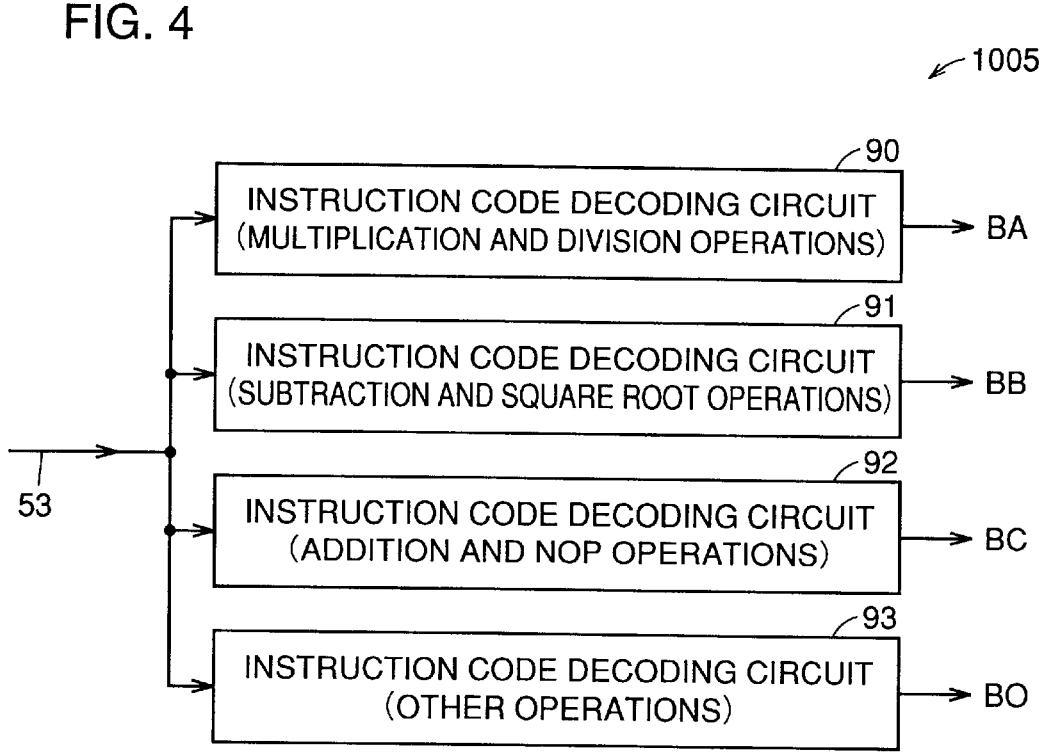
FIG. 4 is a block configuration diagram of the branch decision unit shown in FIG. 3.
Figure 5A:
FIGS. 5A to 5C are diagrams showing field configurations of data packets processed in the data driven type information processing device shown in FIG. 2.
Figure 5B:
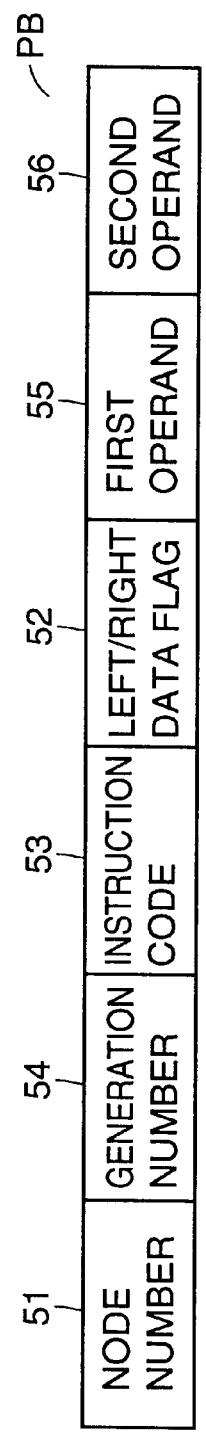
Figure 5C:
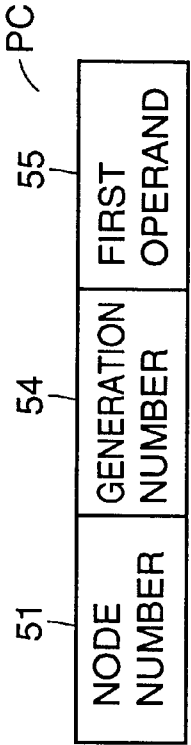

FIG. 3 shows a detailed configuration of a branch unit shown in FIG. 1. FIG. 4 is a block diagram showing a configuration of a branch decision unit shown in FIG. 3. FIGS. 5A to 5C show field configurations of data packets being processed by the data driven type information processing device shown in FIG. 2.

The system shown in FIG. 1 includes: data driven type information processing devices (hereinafter, referred to as "processors") PEA, PEB and PEC, each having a configuration as shown in FIG. 2; input and output ports IN and OUT; a branch unit 101 that refers to an instruction code within a data packet input from port IN and outputs the input data packet to a processor that can process the data packet; and a junction unit 102 that inputs data packets output from branch unit 101 and from processors PEA, PEB and PEC, and sequentially outputs the data packets via output port OUT to the outside.

A data packet PA in FIG. 5A includes a node number 51, a left/right data flag 52, an instruction code 53, a generation number 54 and a first operand 55. A data packet PB in FIG. 5B includes a second operand 56 in addition to the contents of data packet PA. A data packet PC in FIG. 5C includes node number 51, generation number 54 and first operand 55.

Referring to FIG. 2, a data driven type processor PE includes junction units 31 to 33, a filing control unit 34, an operation processing unit 35, a program storage unit 36, a branch unit 37 and an internal buffer 38. Junction units 31 to 33, having the same functions as one another, input data packets PA from corresponding input ports or internal buffer 38, and output them sequentially.

Operation processing unit 35 has operation processing units 35A, 35B and 35C provided for processors PEA, PEB and PEC, respectively. Similarly, branch unit 37 has branch units 37A, 37B and 37C provided for processors PEA, PEB and PEC, respectively.

Processor PEA includes input ports IB, IC and II, and output ports OB, OC and OO. Likewise, processor PEB includes input ports IA, IC and II, and output ports OA, OC and OO. Processor PEC includes input ports IA, IB and II and output ports OA, OB and OO.

Firing control unit 34 waits for data packets PA for a binary operation instruction. More specifically, it waits for two data packets PA having the same node numbers 51 and the same generation numbers 54, and, upon reception of such two data packets, outputs the two data packets PA as one data packet PB to operation processing unit 35. Here, a respective one of the first operands 55 of the two data packets PA is set to first operand 55 or second operand 56 of data packet PB, respectively, determined by the values of left/right data flags 52 included in the relevant data packets PA.

Operation processing unit 35 includes an operation processing circuit 100. In the present embodiment, an operation processing circuit is provided for each instruction system, and operation processing units 35A, 35B and 35C are provided respectively for the operation processing circuits 100 handling the different instruction systems.

Herein, the instruction system means a group of instruction codes consisting of at least one type of instruction code 53.

Operation processing circuit 100 includes a multiplication and division operation processing circuit 100A used for operation processing unit 35A, a subtraction and square root operation processing circuit 100B for operation processing unit 35B, and an addition and NOP (i.e., a process for copying a data packet) operation processing circuit 100C for operation processing circuit 35C.

In operation processing unit 35, operation processing circuit 100 is used to perform an operation for first operand 55 or second operand 56 in input data packet PB, according to instruction code 53 within the input data packet PB. The result of the operation is set as first operand 55 of data packet PC, and data packet PC is output to program storage unit 36.

Figure 6:
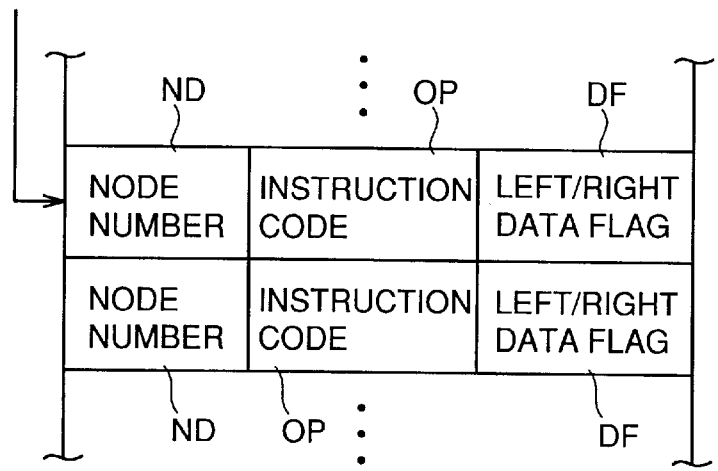
FIG. 6 is a diagram illustrating an example of the contents stored in the program storage unit shown in FIG. 2.

FIG. 6 is a diagram showing an example of the contents stored in program storage unit 36 shown in FIG. 2. Program storage unit 36 prestores a data flow program formed of a plurality of node numbers ND, a plurality of instruction codes OP and a plurality of left/right data flags DF.

In program storage unit 36, subsequent node number ND, instruction code OP and left/right data flag FD are read out from the data flow program, by addressing based on the node number 51 of input data packet PC. The read out node number ND is set as a node number 51 of input data packet PC. Thereafter, the read out instruction code OP and left/right data flag DF are added to data packet PC as instruction code 53 and left/right data flag 52, respectively, and a resultant data packet PA is output to branch unit 37.

Branch unit 37 includes first through fourth output ports. The first output port is a port 00, which is connected to junction unit 102 shown in FIG. 1. The second output port is a port OC connected to processor PEC or a port OB connected to processor PEB. The third output port is a port OB connected to processor PEB or a port OA connected to processor PEA. The fourth output port is connected to internal buffer 38.

Branch unit 37 refers to instruction code 53 of input data packet PA, and operates to output the input data packet PA to processor PEA if it determines that processor PEA can process the instruction code, to processor PEB if it determines processor PEB can process the instruction code, to processor PEC if it determines processor PEC can process the instruction code, or to junction unit 102 if it determines the instruction code cannot be processed by any of the above processors.

The configuration and operation of branch unit 37 are identical to those of branch unit 101, which will be described later.

Junction unit 31 includes two input ports. One of them is a port II for input of data packet PA from branch unit 101 shown in FIG. 1. The other is a port IC or IB for input of data packet PA output from data driven type processor PEC or PEB.

Junction unit 33 includes two input ports, of which one input port is a port for input of data packet PA from internal buffer 38. The other input port is a port IB or IA for input of data packet PA output from data driven type processor PEB or PEA.

Solid arrows showing signal stream between blocks in FIG. 1 correspond to data transmission paths as well as control lines connecting transfer control elements, as shown in FIG. 3.

Branch unit 101 inputs data packet PA via input port IN of the system, and refers to instruction code 53 within the input data packet PA. If the instruction code 53 is a code that can be processed in operation processing unit 35A, branch unit 101 outputs the input data packet to data driven type processor PEA. Likewise, branch unit 101 outputs the input data packet PA to data driven type processor PEB if the code can be processed in operation processing unit 35B, and to data driven type processor PEC if the code can be processed in operation processing unit 35C. Otherwise, the input data packet PA is output directly to junction unit 102.

The operation of branch unit 101 will now be described with reference to FIG. 3. In FIG. 3, the configuration of branch unit 101 is shown in conjunction with associated portions; i.e., a portion of port IN at its output side, portions of processors PEA, PEB and PEC at their junction unit 31 sides connected to their ports II, and a portion of junction unit 102 at its input side.

Referring to FIG. 3, the output side of input port IN includes: data transmission paths 1011, 1012 and a data latch circuit 1003 forming a pipeline for transmission of data packets; and a transfer control element 1001 for controlling the latch timing of a data packet by data latch circuit 1003.

The junction unit 31 sides of respective processors PEA, PEB and PEC include: data latch circuits 100A2, 100B2 and 100C2 that input and latch data packets provided via data transmission path 1013 and output the data packets to data transmission paths 100A3, 100B3 and 100C3, respectively, connected to their relevant junction units 33; and transfer control elements 100A1, 100B1 and 100C1 for controlling the latch timing of their corresponding data latch circuits. The input side of junction unit 102 includes: a data latch circuit 1022 that inputs and latches a data packet provided via data transmission path 1013 and outputs the same to a data transmission path 1023 connected to output port OUT; and a transfer control element 1021 for controlling the latch timing of data latch circuit 1022.

Branch unit 101 includes data transmission paths 1012, 1013 and a data latch circuit 1004 forming a pipeline for transmission of data packets. It further includes a transfer control element 1002 for controlling the latch timing of data latch circuit 1004, a branch decision unit 1005, an inverter 1006, an AND circuit 1007, and NAND circuits 1008, 1009, 1010 and 1011.

Data transmission path 1013 at the output side of data latch circuit 1004 splits into four branches, which are connected to input stages of data latch circuits 100A2, 100B2, 100C2 and 1022, respectively, at the input sides of processors PEA, PEB, PEC and of junction unit 102.

Each of transfer control elements 1001, 1002, 100A1, 100B1, 100C1 and 1021 generates a clock pulse for control of the latch timing of data packet by its relevant data latch circuit, and sends the pulse to the data latch circuit.

Each of transfer control elements 1001, 1002, 100A1, 100B1, 100C1 and 1021 includes a terminal CI for input of a data retaining signal, a terminal CO for output of the data retaining signal, an input terminal RI for an empty signal, an output terminal RO for the empty signal, and a terminal CP for output of the above-described clock pulse. Each transfer control element controls transmission of data packets via transmission paths, by sending and receiving the data retaining signals and the empty signals to and from the transfer control elements in its preceding and succeeding stages. The empty signal and the data retaining signal will be described later.

Branch decision unit 1005 includes: an instruction code decoding circuit 90 for decoding multiplication or division operation codes; an instruction code decoding circuit 91 for decoding subtraction or square root operation codes; an instruction code decoding circuit 92 for decoding addition or NOP operation codes; and an instruction code decoding circuit 93 for decoding the other operation codes, as shown in FIG. 4.

In operation, each of instruction code decoding circuits 90 to 93 receives (refers to), in parallel, instruction code 53 within a data packet on data transmission path 1012 provided via data latch circuit 1003 at input port IN, and, based on the instruction code 53, sets levels of output signals BA, BB, BC and BO to output to data latch circuit 1004. More specifically, branch decision unit 1005 sets the levels of the output signals so that: output signal BA=1 and output signals BB=BC=BO=0 if the instruction code 53 is a multiplication or subtraction operation code that can be processed at operation processing unit 35A in processor PEA; output signal BB=1 and output signals BA=BC=BO=0 if instruction code 53 is a subtraction or square root operation code that can be processed by operation processing unit 35B of processor PEB; output signal BC=1 and output signals BA=BB=BO=0 if instruction code 53 is an addition or NOP operation code that can be processed by operation processing unit 35C of processor PEC; and output signal BO=1 and output signals BA=BB=BC=0 if instruction code 53 is an operation code that cannot be processed by any operation processing unit of any processor. Branch decision unit 1005 then outputs the output signals to the input side of data latch circuit 1004.

Inverter 1006 has its input connected to output terminal CO of transfer control element 1002.

NAND circuit 1008 has one input connected to an output of inverter 1006, and the other input receiving a signal BA1 that matches output signal BA of branch decision unit 1005 latched via data latch circuit 1004.

NAND circuit 1009 has one input connected to the output of inverter 1006, and the other input receiving a signal BB1 that matches output signal BB of branch decision unit 1005 latched via data latch circuit 1004.

NAND circuit 1010 has one input connected to the output of inverter 1006, and the other input receiving a signal BC1 that matches output signal BC of branch decision unit 1005 latched via data latch circuit 1004.

NAND circuit 1011 has one input connected to the output of inverter 1006, and the other input receiving a signal BO1 that matches output signal BO of branch decision unit 1005 latched via data latch circuit 1004.

AND circuit 1007 has its input connected to empty signal output terminals RO of transfer control elements 100A1, 100B1, 100C1 and 1021, and its output connected to input terminal RI of transfer control element 1002.

NAND circuits 1008,. 1009, 1010 and 1011 have their outputs connected to input terminals CI of transfer control elements 100A1, 100B1, 100C1 and 1021, respectively.

The operation of branch unit 101 shown in FIG. 3 will now be described with reference to the timing charts of FIGS. 7A to 7T. Herein, to describe transmission of a data packet, a side sending the data packet is called a "preceding" stage, and a side receiving the sent data packet is called a "succeeding" stage.

FIGS. 7A to 7T illustrate: output states of data packets at data latch circuits 1004 and 100A2; signal levels of output signals BA1, BB1, BC1 and BO1 of branch decision unit 1005; and signal levels at the input and output terminals of respective transfer control elements 1002, 100A1, 100B1, 100C1 and 1021.

Firstly, assume that empty signals and data retaining signals output from output terminals RO and CO of transfer control elements 1001, 1002, 100A1, 100B1, 100C1 and 1021 are all at a high level. At this time, the empty signals provided to input terminals RI of transfer control elements 1001 and 1002 are at a high level. Thus, in the case where the empty signal provided from the succeeding stage to the preceding stage is at the high level, it means that the succeeding stage can accept a data packet from the preceding stage. Conversely, if the empty signal provided from the succeeding stage to the preceding stage is at a low level, it means that the succeeding stage cannot accept the data packet because it is not ready for the acceptance.

If the empty signal at terminal RO of transfer control element 1002 is at the high level and a data packet is latched at data latch circuit 1003 (i.e., when it is ready to transfer the data packet to the succeeding data latch circuit 1004), the data retaining signal provided from the preceding stage to input terminal CI of transfer control element 1002 falls to the low level indicating that the data packet is input to data latch circuit 1004. Accordingly, transfer control element 1002 causes the empty signal that is provided from its output terminal RO to the preceding transfer control element, to fall to the low level.

The preceding transfer control element 1001, in response to the event that the empty signal provided to its input terminal RI from transfer control element 1002 attains the low level, causes the data retaining signal being output via its output terminal CO to rise to the high level. At this time, in response to the event that the data retaining signal provided to input terminal CI rises to the high level, transfer control element 1002 causes both the clock pulse being output from terminal CP to corresponding data latch circuit 1004 and the empty signal being output from output terminal RO, to rise to the high level.

In response to the rise of the clock pulse provided from terminal CP of corresponding transfer control element 1002, data latch circuit 1004 latches the data packet output form data latch circuit 1003 and output signals BA, BB, BC and BO of branch decision unit 1005.

Here, assuming that instruction code 53 within the data packet provided from input port IN to branch unit 101 is a multiplication or division operation code, output signal BA of branch decision unit 1005 attains a high level (1), and output signals BB, BC and BO thereof each attain a low level (0).

Further, in response to the rise of the latch pulse output from terminal CP, transfer control element 1002 causes the data retaining signal being output from terminal CO to fall to the low level. Thus, the output of inverter 1006 rises from the low level to the high level. As output signal BA1 of branch decision unit 1005 latched at data latch circuit 1004 is at the high level, the output of NAND circuit 1008 falls from the high level to the low level.

Transfer control element 100A1, in response to the data retaining signal provided to input terminal CI (i.e., the output signal of NAND circuit 1008) attaining the low level, causes the empty signal being output from output terminal RO to fall from the high level to the low level.

As output signals BB1, BC1 and BO1 of branch decision unit 1005 latched at data latch circuit 1004 are each at the low level, the output signals of NAND circuits 1009, 1010 and 1011 (i.e., the data retaining signals input to input terminals CI of transfer control elements 100B1, 100C1 and 1021, respectively) are constantly kept at the high level, regardless of the output signal of inverter 1006. Therefore, transfer control elements 100B1, 100C1 and 1021 do not operate, and the empty signals output from output terminals RO of these transfer control elements remain at the high level.

The output signal of AND circuit 1007 attains the low level in response to the empty signal output from output terminal RO of transfer control element 100A1 attaining the low level. At this time, in response to the empty signal provided to its input terminal RI attaining the low level, transfer control element 1002 causes the latch pulse being output from terminal CP to fall to the low level, and also causes the data retaining signal being output from output terminal CO to rise from the low level to the high level. Therefore, in transfer control element 100A1, the data retaining signal provided to its input terminal CI attains the high level, and thus, the clock pulse being output from its terminal CP to data latch circuit 100A2 rises. Accordingly, the data packet within data latch circuit 1004 is latched to data latch circuit 100A2, the empty signal being output from terminal RO of transfer control element 100A1 rises to the high level again, and the empty signal provided to input terminal RI of transfer control element 1002 also rises to the high level. At this time, transfer control elements 100B1, 100C1 and 1021 do not operate.

In the case where signal BA=1 and signals BB=BC= BO=0 as described above, the data latched to data latch circuit 1004 at branch unit 101 is latched only to data latch circuit 100A2 for processor PEA; it is not latched to data latch circuit 100B2 for processor PEB, data latch circuit 100C2 for PEC, or data latch circuit 1022 for junction unit 102.

As described above, the data of data latch circuit 1004 is latched to only one of data latch circuits 100A2, 100B2, 100C2 and 1022, according to the values of output signals BA, BB, BC and BO of branch decision unit 1005. The data is not latched to the other data latch circuits.

Accordingly, branch unit 101 can selectively output a data packet input therein to any of processors PEA, PEB, PEC or to junction unit 102, according to a result of decision by branch decision unit 1005 on instruction code 53 within the input data packet. Note that branch unit 101 does not alter the configuration of the data packet.

FIG. 1 shows branch unit 101 having four branches. However, the number of branches is arbitrary, which may be determined based on the number of instruction systems that can be processed in the system.

The data packets provided from branch unit 101 to their relevant processors PEA, PEB and PEC are operated in the processors, and instruction codes 53 are updated by instruction fetch by program storage unit 36. Thereafter, each data packet is output from branch unit 37 to any of 1) the processor itself (internal buffer 38), 2) another processor or 3) junction unit 102, according to the instruction code 53.

Figure 8:
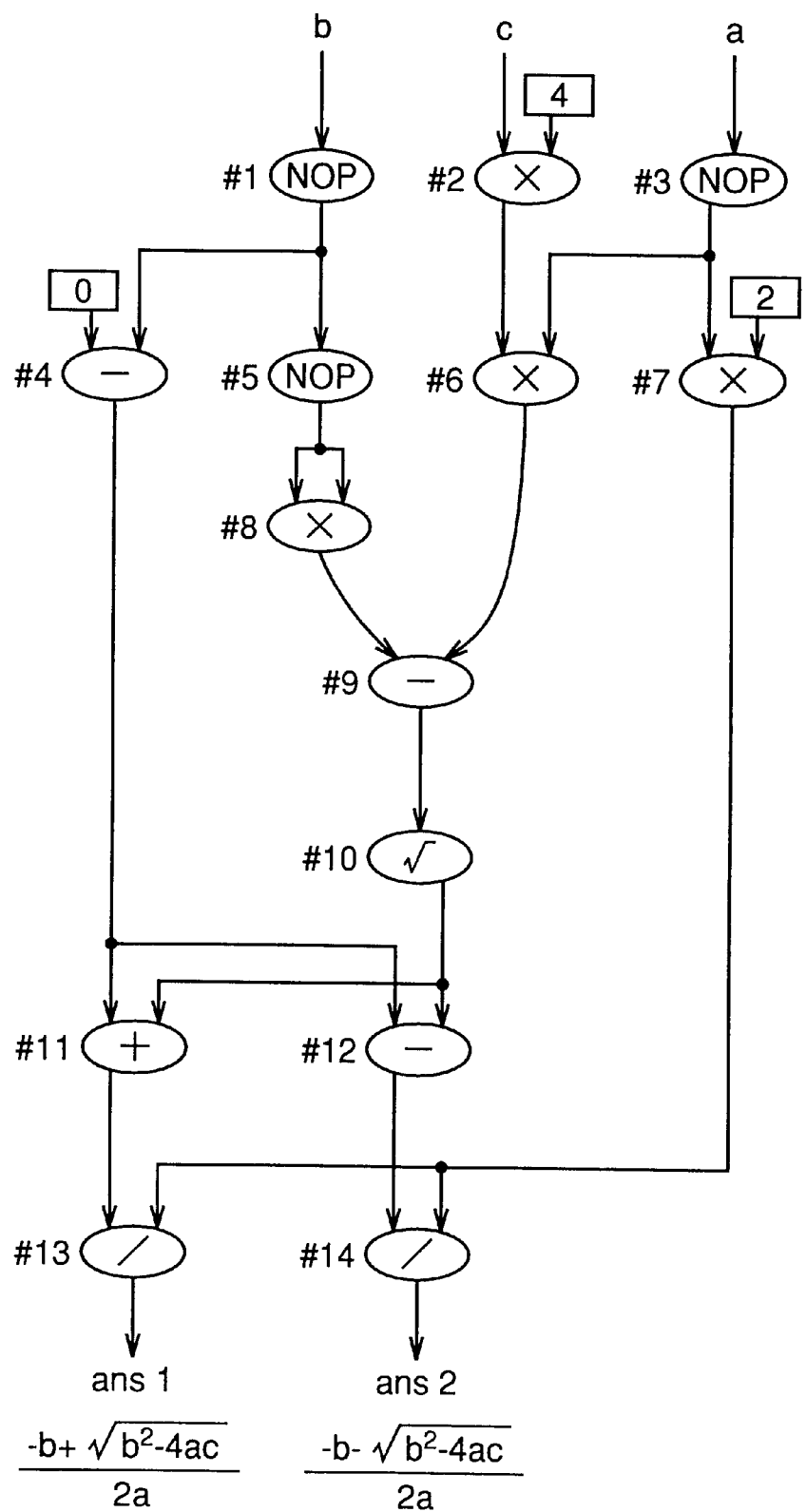
FIG. 8 is a diagram showing an example of a data flow graph (data flow program) carried out by the system shown in FIG. 1.

FIG. 8 shows an example of a data flow graph (data flow program) executed in the system as shown in FIG. 1. Here, the operation of the system of FIG. 1 will be described assuming that it is to perform the data flow graph of FIG. 8.

In FIG. 8, each node has an operation code corresponding to an instruction code 53, such as NOP, ×, −,√0, + and /, and a node number #i (i =1, 2, . . . , 14) assigned thereto. The arrows input to the nodes represent the input data to be operated therein, and the arrows output from the nodes represent the output data being the operation results.

Operation processing unit 35A of processor PEA in FIG. 1 includes operation processing circuit 100A that processes multiplication and division operation codes, i.e., the operation codes assigned to the nodes having node numbers #2, #6, #7, #8, #13 and #14 on the data flow graph of FIG. 8. Operation processing unit 35B of processor PEB includes operation processing circuit 100B that processes subtraction and square root operation codes; i.e., the operation codes assigned to the nodes having node numbers #4, #9, #10 and #12 on the data flow graph of FIG. 8. Operation processing unit 35C of processor PEC includes operation processing circuit 100C that processes addition and NOP operation codes; i.e., the operation codes assigned to the nodes having node numbers #1, #3, #5 and #11 on the data flow graph of FIG. 8.

Assume that data packet PA input from input port IN first has node number 51 of "#2", instruction code 53 of "a value indicating multiplication by 4", left/right data flag 52 of "a value indicating that it is a left data", first operand 55 of "a value of data'c'", and generation number 54 of "an arbitrary value", as their preset values.

Branch unit 101 determines that the value of instruction code 53 indicates a "multiplication or division operation code", and thus, this data packet PA is output to processor PEA.

In processor PEA, operation processing unit 35A processes the operation of node number #2, and data packet PC having the result of the operation stored therein is applied to program storage unit 36. In program storage unit 36, instruction fetch is performed using data packet PC, and the subsequent node number #6 and instruction code (×) are read out. Thus, branch unit 37 determines that the subsequent instruction code 53 indicates a multiplication or division operation code, and the data packet PA is given to internal buffer 38.

In processor PEA, operation processing unit 35A processes the operation of node number #6. Data packet PC storing the operation result is used for instruction fetch in program storage unit 36, and the subsequent node number #9 and instruction code (−) are stored therein, and is output as data packet PA to branch unit 37. Branch unit 37 determines that the instruction code 53 of data packet PA indicates a subtraction or square root operation code, and thus, the data packet PA is output via output port OB of branch unit 37A to processor PEB.

Thereafter, data packet PA being processed is sent to and from the processors in the same manner as described above, to execute the data flow graph shown in FIG. 8. Data packets PA storing values of data "a" and "b" as their first operands 55, respectively, are also processed in parallel with and in the same manner as the data packet PA having the value of data "c". As a result, answers (ans1 and ans2) are obtained as shown in FIG. 8.

Second Embodiment

Figure 9:
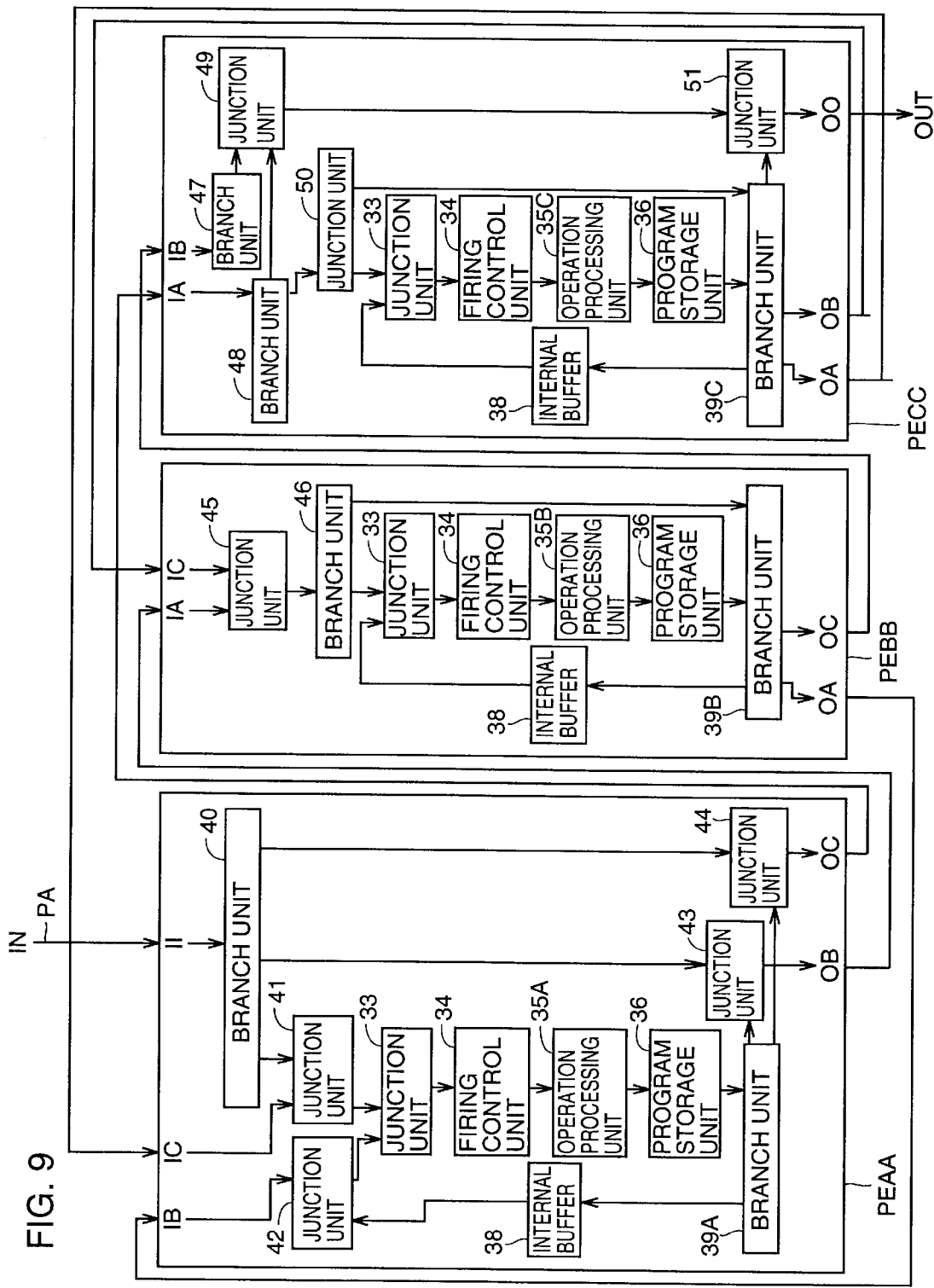
FIG. 9 is a diagram showing a configuration of a system including a plurality of data driven type information processing devices according to a second embodiment of the present invention.

FIG. 9 shows a configuration of a system including a plurality of data driven type information processing devices according to the second embodiment of the present invention. In FIG. 9, the same reference characters are used to denote corresponding, identical portions in FIGS. 10 through 12, which will be described later.

A fundamental difference between the system shown in FIG. 9 and the system shown in FIG. 1 is a block configuration of each processor therein, and correspondingly, their data packet transmission paths. Basic procedures for information processing are common in the two systems, and therefore, detailed description thereof will not be repeated.

In the system shown in FIG. 9, the data packet provided from input port IN has a field configuration the same as that of data packet PA in FIG. 5A. The system of FIG. 9 includes input port IN, output port OUT and data driven type processors PEAA, PEBB and PECC.

Figure 10:
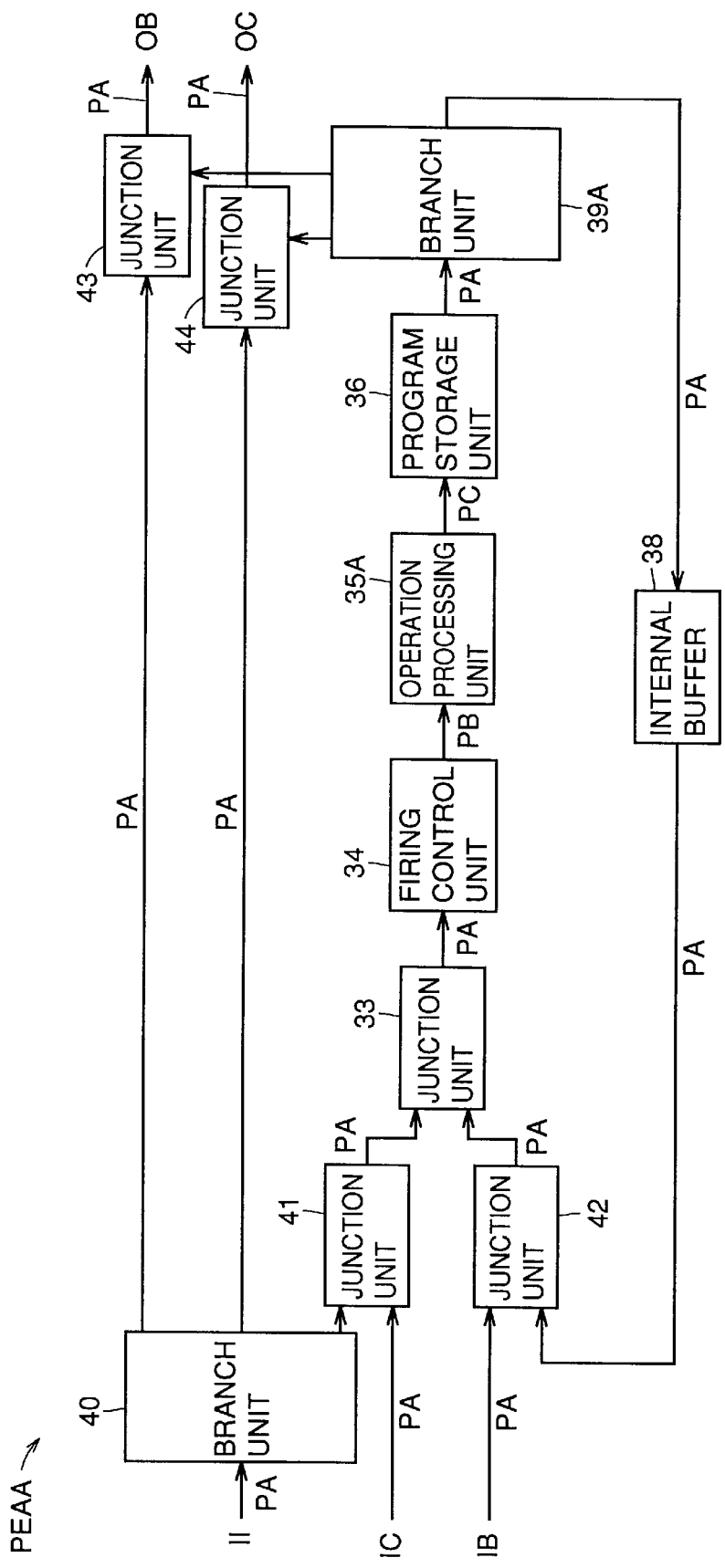
FIG. 10 is a diagram showing a first block configuration of the data driven type information processing device according to the second embodiment of the present invention.
Figure 11:
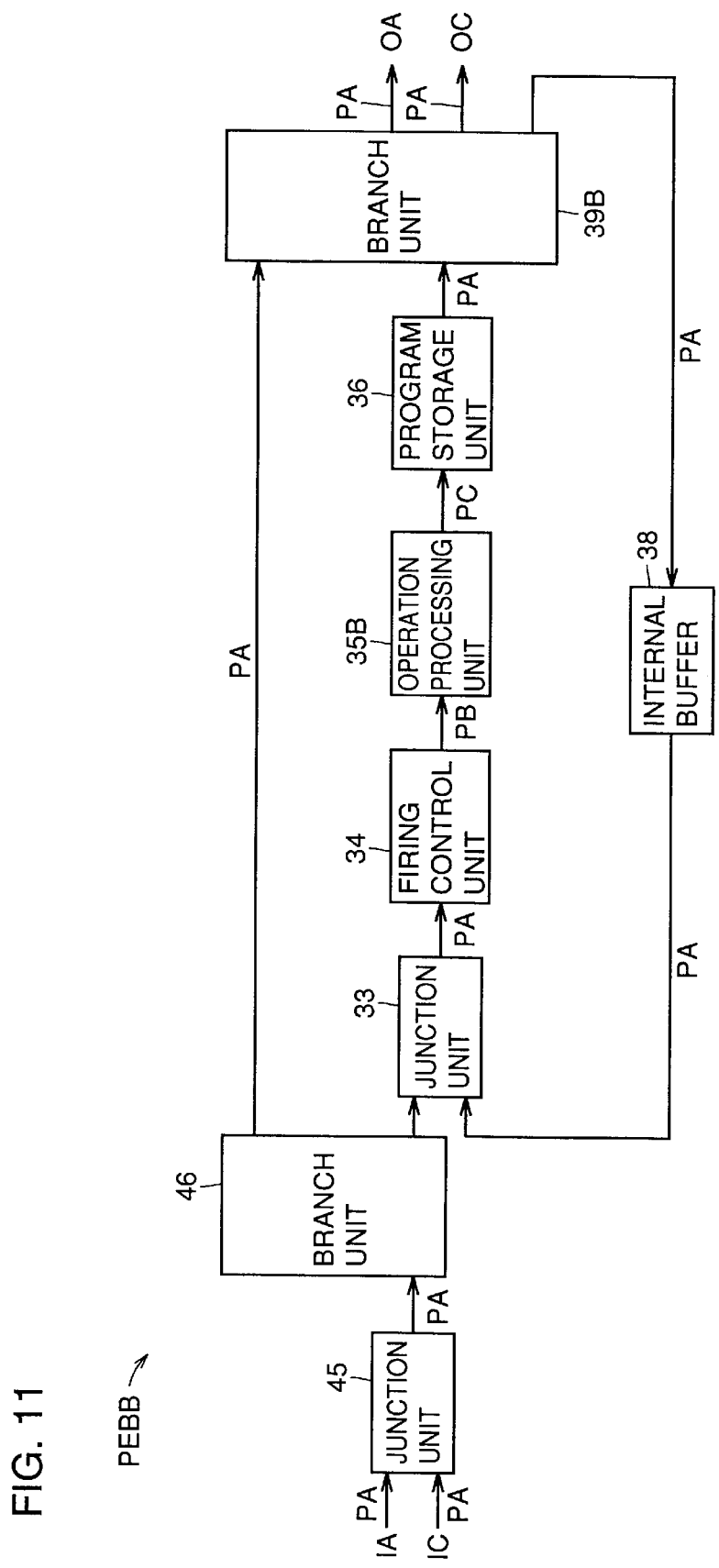
FIG. 11 is a diagram showing a second block configuration of the data driven type information processing device according to the second embodiment of the present invention.
Figure 12:
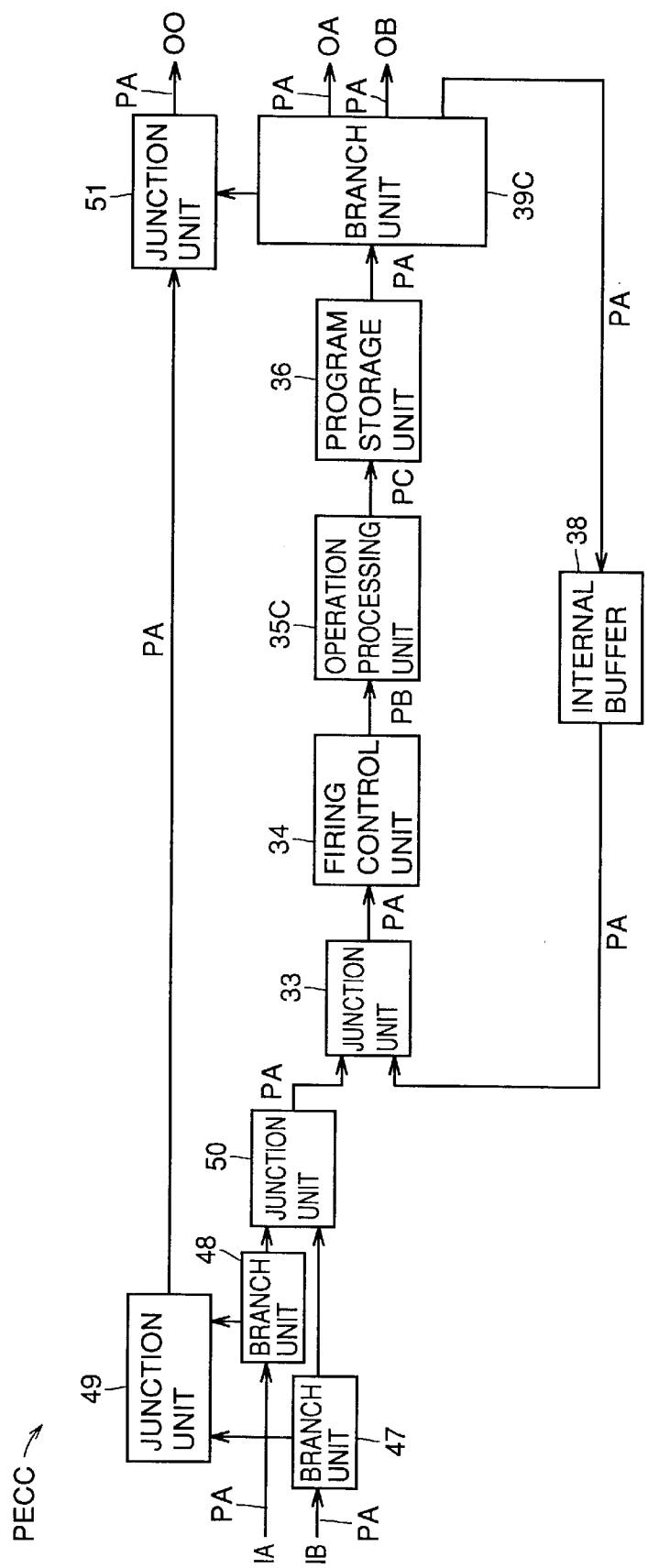
FIG. 12 is a diagram showing a third block configuration of the data driven type information processing device according to the second embodiment of the present invention.
Figure 13:
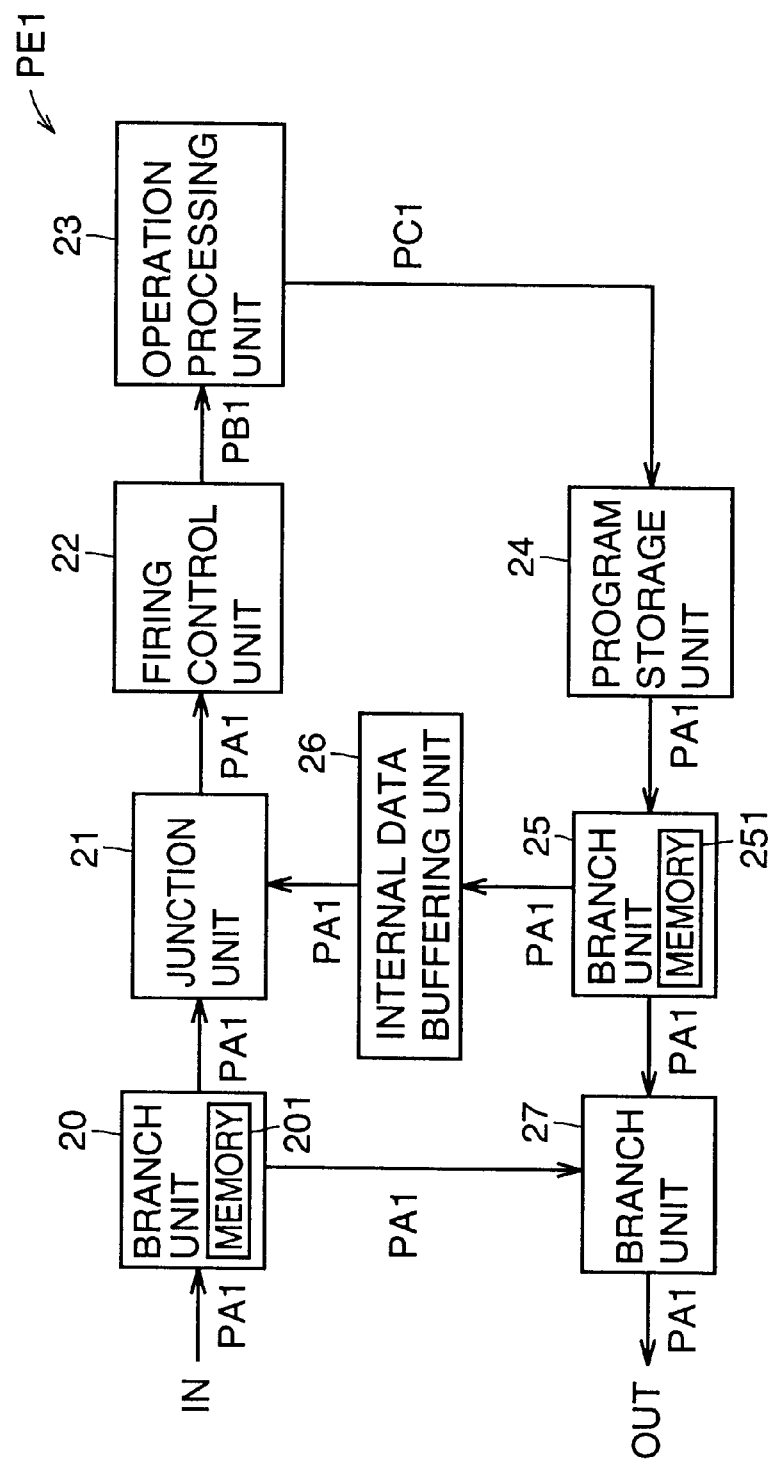
FIG. 13 is a block configuration diagram of a conventional data driven type processor.
Figure 15:
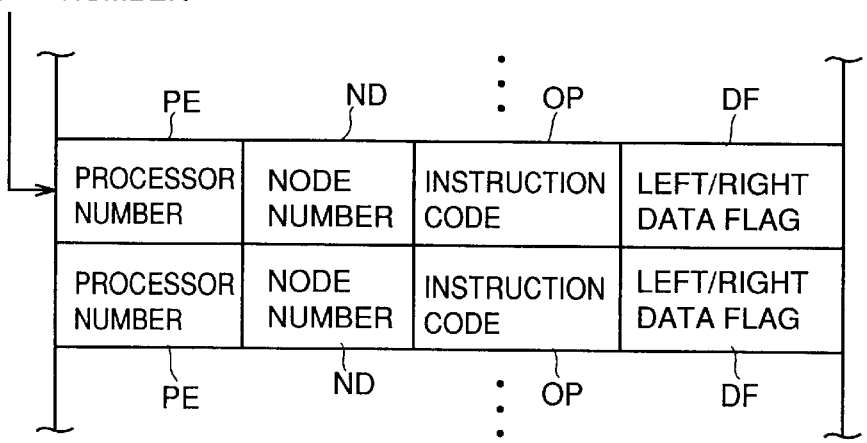
FIG. 15 is a diagram showing an example of the contents stored in the program storage unit shown in FIG. 13.
Figure 16:
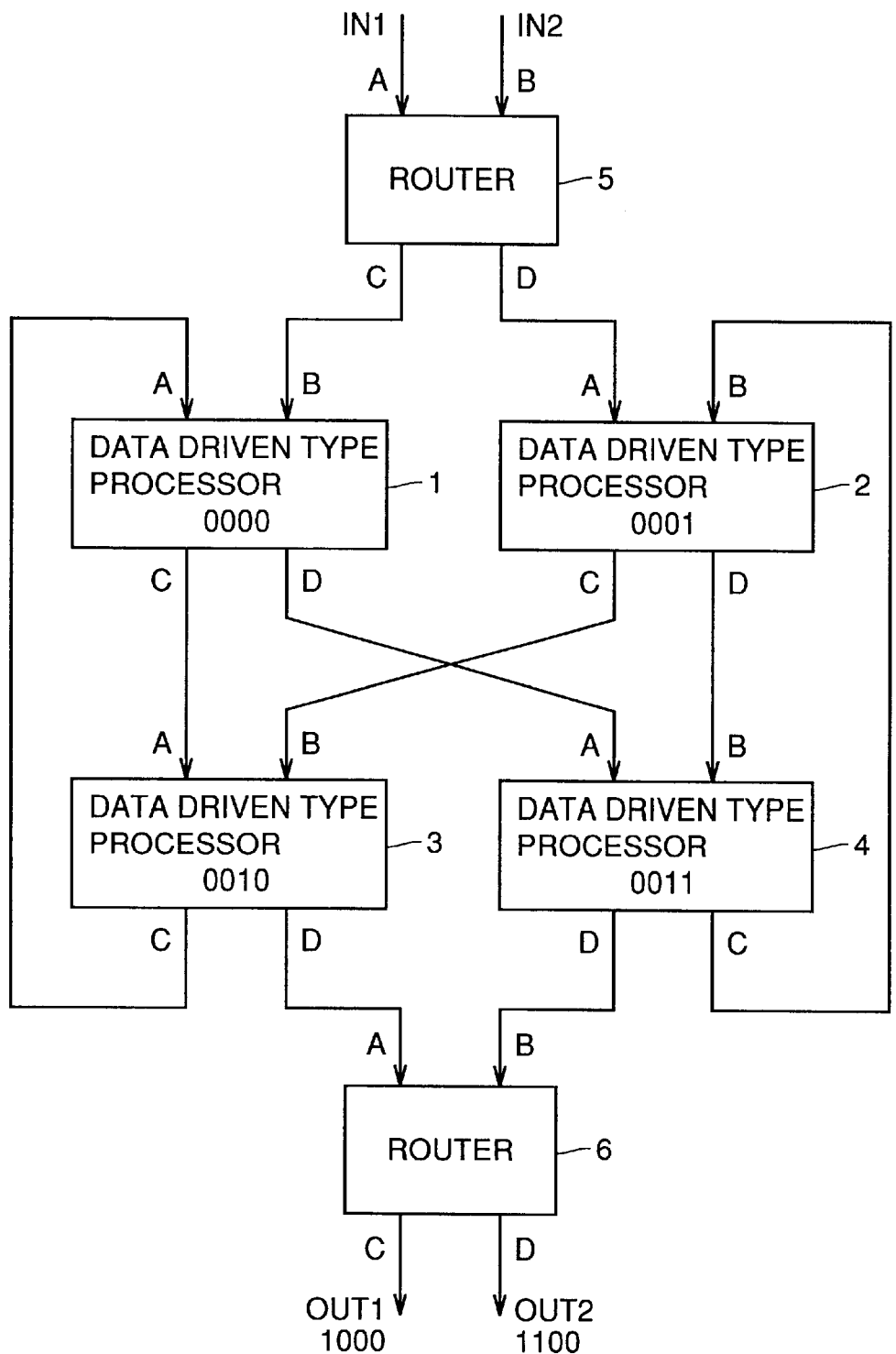
FIG. 16 is a diagram showing a configuration of a system including a plurality of data driven type processors, each as shown in FIG. 13.

FIGS. 10 to 12 show first to third block configurations of the data driven type information processing devices according to the second embodiment. The configurations of data driven type processors PEAA, PEBB and PECC in FIGS. 10 to 12 are identical to those of data driven type processors PEA, PEB and PEC of FIG. 1 in portions other than the branch units and junction units; i.e., in the portions for information processing. Thus, the detailed description thereof is not repeated. In the processors in FIGS. 10 to 12, each junction unit inputs data packets PA and sequentially outputs them. Each of the branch units shown in FIGS. 10 to 12 has a configuration basically the same as that of branch unit 101 shown in FIG. 3, except for the number of branches as well as the configuration at a gate level of instruction code decoding circuits 90 to 93 of branch decision unit 1005. Therefore, description of the identical portions will not be repeated.

In data driven type processor PEAA in FIG. 10, branch unit 40 inputs data packet PA from port IN, and outputs the same to junction unit 41 if it is determined that the instruction code 53 can be processed in operation processing unit 35A, to junction unit 43 connected to output port OB if instruction code 53 is determined processable in operation processing unit 35B in processor PEBB, and to junction unit 44 connected to output port OC if instruction code 53 is determined to be processable in operation processing unit 35C in processor PECC.

Thereafter, data packet PA input into junction unit 41 within processor PEAA is sent along a path through the succeeding junction unit 33→ firing control unit 34→ operation processing unit 35A→ program storage unit 36→ branch unit 39A, and thus, processing for one node of the data flow graph is completed. Data packet PA input into branch unit 39A is then processed as follows, based on an instruction code 53 updated by instruction fetch of program storage unit 36 in the same manner as described in conjunction with branch unit 101 shown in FIG. 1. Specifically, if the updated instruction code 53 is determined that it can be processed at operation processing unit 35A within processor PEAA, the input data packet PA is output to internal buffer 38. Similarly, if it is determined that the updated instruction code 53 can be processed at operation processing unit 35B within processor PEBB, the input data packet PA is output to port IA of processor PEBB via junction unit 43 connected to output port OB, together with data packet PA from branch unit 40. Likewise, if it is determined that the updated instruction code 53 can be operated at operation processing unit 35C within processor PECC or if it is determined that the code should be output to port OUT (i.e., if it is determined that the instruction code 53 cannot be processed by any operation processing unit 35 of any processor), the data packet PA is output, together with data packet PA from branch unit 40, via junction unit 44 connected to output port OC to input port IA of processor PECC.

Data packets PA input to input ports IA and IC of data driven type processor PEBB are output at junction unit 45 to the order in which they were input, and sent along a path through the succeeding junction unit 33 → firing control unit 34→ operation processing unit 35B→ program storage unit 36→ branch unit 39B. Thus, processing for one node of the data flow graph is completed.

Next, the data packet PA input into branch unit 39B is processed based on the instruction code 53 within the data packet PA that is updated in advance at program storage unit 36, as follows. The data packet PA is output to internal buffer 38 if it is determined that the instruction code 53 can be processed at operation processing unit 35B within processor PEBB. Likewise, it is output via branch unit 39B to output port OA if it is determined that it can be processed at operation processing unit 35A within processor PEAA. If the instruction code 53 is determined to be processable at operation processing unit 35C within processor PECC, data packet PA is output via branch unit 39B to output port OC.

Data packets PA input into ports IA and IB of processor PECC are processed at branch units 48 and 47, respectively, based on the instruction codes 53 within data packets PA, as follows. Each data packet PA is output via junction unit 49 to output port OUT (port OO) unless it is determined that the instruction code 53 can be processed at operation processing unit 35C. If it is determined to be processable at operation processing unit 35C, data packet PA is output to junction unit 50.

Thereafter, the data packet PA output to junction unit 50 within processor PECC is sent along a path through the succeeding junction unit 33→ firing control unit 34→ operation processing unit 35C→ program storage unit 36→ branch unit 39C. Processing for one node of the data flow graph is thus completed. Data packet PA is then processed at branch unit 39C based on instruction code 53 that is updated in advance by instruction fetch in program storage unit 36, as follows. The data packet PA is output to internal buffer 38 if the instruction code 53 is determined to be processable at operation processing unit 35C within processor PECC; to output port OA if it is determined it can be processed at operation processing unit 35A within processor PEAA; and to output port OB if it is determined it can be processed at operation processing unit 35B within processor PEBB. If the instruction code 53 is determined that it cannot be processed at any of the operation processing units, the data packet PA is output, together with data packet PA from junction unit 49, via junction unit 51 to output port OUT (output port OO).

An operation will now be described assuming that the configurations as shown in FIGS. 9 and 12 are used to perform the data flow graph (data flow program) shown in FIG. 8.

Operation processing unit 35A has operation processing circuit 100A assigned thereto, which processes multiplication and division operations; i.e., the instruction codes of the nodes having node numbers #2, #6, #7, #8, #13 and #14 on the data flow graph of FIG. 8. Operation processing unit 35B has operation processing circuit 100B assigned thereto, which processes subtraction and square root operations; i.e., the instruction codes of the nodes having node numbers #4, #9, #10 and #12 on the data flow graph of FIG. 8. Operation processing unit 35C has operation processing circuit 100C assigned thereto, which processes addition and NOP operations; i.e., the instruction codes of the nodes having node numbers #1, #3, #5 and #11 on the data flow graph of FIG. 8. In this case, the data packet is processed as follows.

Data packet PA input from input port IN originally has node number 51 of "#2", instruction code 53 of "a value indicating multiplication by 4", left/right data flag 52 of "a value indicating that it is a left data", first operand 55 of "a value of data 'c'", and generation number 54 of "an arbitrary value", as preset values.

Branch unit 40 within data driven type processor PEAA determines that this data packet PA is a data packet for a "multiplication or division operation", based on the instruction code 53. Thus, the data packet PA is output to junction unit 41 within the processor, and then sent along a path through the succeeding junction unit 33→ firing control unit 34→ operation processing unit 35A→ program storage unit 36→ branch unit 39A, whereby processing for one node of the data flow graph is completed. The instruction code assigned to the node having node number #2 is thus processed, instruction fetch is performed at program storage unit 36, and the subsequent node number #6 is stored into data packet PA. As the instruction code of the node having node number #6 indicates a multiplication or division operation, data packet PA is output from branch unit 39A, not to the outside of processor PEAA, but to internal buffer 38.

Next, in processor PEAA, the operation of the node having node number #6 is processed, instruction fetch is performed at program storage unit 36, and thus, data packet PA having the succeeding node number #9 stored therein is obtained. As the instruction code 53 within the data packet PA indicates a subtraction operation, data packet PA is output from branch unit 39A via junction unit 43, from output port OB to processor PEBB.

Thereafter, the data packet PA being processed is sent to and from the processors in the same manner as described above, to perform the data flow graph. In parallel with this, data packets PA storing values of data "a" and "b" as their first operands 55, respectively, are processed in the same manner, and, as a result, answers (ans1 and ans2) shown in FIG. 8 are obtained.

According to the first and second embodiments as described above, the data driven type processors in a system are each configured to have a different instruction system that can be processed therein, and transmission paths for data packets PA are selected according to the instruction codes 53 therein such that each data packet PA is transmitted to a processor that can process the data packet PA. Therefore, it is unnecessary to add a processor number to each processor as in the conventional case, and hence, each data packet does not need a PE number storing region. Accordingly, the scale of the circuits as well as the cost and the power consumption of the system can be reduced.

As the power consumption is decreased, the costs for countermeasures against radiation in a package incorporating the system is also decreased. As the PE number storing region is unnecessary within the data packet, the data width of the data packet can be reduced. The number of the terminals for the data packets in the system can be also decreased, and therefore, unnecessary emission can be reduced.

In the system of the first embodiment, the branch unit and the junction unit are disposed outside of a plurality of processors. Therefore, the processors can be arranged orderly, without having to taking into consideration the differences in the operation processing units of the processors at the time of system configuration. Accordingly, the system of the first embodiment can be applied advantageously to the case where an orderly layout of processors is required.

In the system of the second embodiment, each processor independently determines whether it can perform an operation for a data packet or not. Therefore, it is possible to alter the layout of the processors according to the differences in the operation processing units thereof. Accordingly, the system of the second embodiment is advantageously applied to the case where orderly layout of the processors is difficult.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A data driven type information processing system having a plurality of data driven type processors for processing a data packet storing at least instruction information, the plurality of data driven type processors being connected with one another via a plurality of data transmission paths for transmitting said data packet, wherein each of said plurality of data driven type processors is capable of processing a different instruction system consisting of at least one type of said instruction information, said plurality of data transmission paths including a processor transmission path for transmitting said data packet to a respective one of said plurality of data driven type processors;

said data driven type information processing system includes a first path select unit at an input stage of said data driven type information processing system, to which a plurality of said data transmission paths including said processor transmission path corresponding to each of said plurality of data driven type processors are connected, said first path select unit inputting said data packet applied thereto, selecting, based on said instruction information within the input data packet, said processor transmission path corresponding to said data driven type processor that can process said instruction system relevant to a type of the instruction information from the plurality of said data transmission paths connected to said first path select unit, and outputting the input data packet to selected said processor transmission path; and each of said plurality of data driven type processors includes a second path select unit provided at an output stage of the data driven type processor, to which a plurality of said data transmission paths including said processor transmission path corresponding to a respective one of other said data driven type processors are connected, and a processing unit that inputs said data packet applied thereto, performs information processing including an operation based on said instruction information using the input data packet, and outputs said data packet obtained as a result of said information processing, said second path select unit inputting said data packet output from said processing unit, selecting, based on said instruction information in the input data packet, said processor transmission path connected to said data driven type processor that can process said instruction system relevant to a type of the instruction information from the plurality of said data transmission paths connected to said second path select unit, and outputting the input data packet to selected said processor transmission path.

2. The data driven type information processing system according to claim 1, wherein the plurality of said data transmission paths connected to said first path select unit further includes an external transmission path for transmitting said data packet to an outside of said data driven type information processing system, said first path select unit inputting said data packet applied thereto, selecting, based on said instruction information within the input data packet, either said external transmission path or said processor transmission path connected to said data driven type processor that can process said instruction system relevant to the type of the instruction information from the plurality of said data transmission paths connected to said first path select unit, and outputting the input data packet to the selected transmission path, and the plurality of said data transmission paths connected to said second path select unit further includes said external transmission path, said second path select unit inputting said data packet output from said processing unit, selecting, based on said instruction information within the input data packet, either said external transmission path or said processor transmission path connected to said data driven type processor that can process said instruction system relevant to the type of the instruction information from the plurality of said data transmission paths connected to said second path select unit, and outputting the input data packet to the selected transmission path.

3. The data driven type information processing system according to claim 2, wherein the plurality of said data transmission paths connected to said second path select unit further includes a processing unit transmission path for transmitting said data packet to said processing unit, said second path select unit (a) inputting said data packet output from said processing unit, (b) selecting, based on said instruction information within the input data packet, any of (1) said processor transmission path connected to said data driven type processor that can process said instruction system relevant to the type of the instruction information, (2) said external transmission path or (3) said processing unit transmission path, from the plurality of said data transmission paths connected to said second path select unit, and (c) outputting the input data packet to the selected transmission path.

4. The data driven type information processing system according to claim 1, wherein each of said first path select unit and said second path select unit decodes said instruction information of said data packet input, and according to a result of the decoding, selectively determines, from the plurality of said data transmission paths connected thereto, said data transmission path to which said data packet input is to be output.

5. A data driven type information processing system having a plurality of data driven type processors communicated with one another using a transmission path for transmitting a data packet storing at least instruction information, wherein each of said plurality of data driven type processors is capable of performing an operation for a different instruction system consisting of at least one type of said instruction information, and includes a processing unit that connects said transmission path, inputs said data packet provided via the transmission path, performs information processing including said operation based on said instruction information using the input data packet, and outputs said data packet obtained by the information processing, and a path select unit to which said data packet is provided from an outside of said data driven type processor or from said processing unit, said path select unit inputting said data packet applied thereto, selecting, based on said instruction information within the input data packet, said transmission path connected to either another said data driven type processor or said processing unit which can perform said operation for said instruction system relevant to the type of the instruction information from a plurality of said transmission path connected in advance to said path select unit, and outputting the input data packet to selected said transmission path.

6. The data driven type information processing system according to claim 5, wherein said path select unit includes said transmission path connected to an outside of said data driven type information processing system at an output stage, said path select unit (a) inputting said data packet applied thereto, (b) selecting, based on said instruction information within the input data packet, said transmission path connected to any of (1) another said processor, (2) said processing unit or (3) the outside of said data driven type information processing system which can perform said operation for said instruction system relevant to a type of the instruction information from the plurality of said transmission paths connected in advance to said path select unit, and (c) outputting the input data packet to selected said transmission path.

7. The data driven type information processing system according to claim 5, wherein said path select unit decodes said instruction information within said data packet input, and, according to a result of the decoding, selectively determines, from the plurality of said transmission paths connected thereto, said transmission path to which said data packet input is to be output.

* * * * *